(12) United States Patent
Choi et al.

(10) Patent No.: US 7,579,406 B2
(45) Date of Patent: Aug. 25, 2009

(54) TRANSPARENT THERMOPLASTIC RESIN COMPOSITIONS AND PROCESS FOR PREPARING THE SAME

(75) Inventors: Jeong-su Choi, Daejeon (KR); Mi-young Lee, Seoul (KR); Hyong-min Bahn, Yeosu-si (KR); Keun-hoon Yoo, Yeosu-si (KR); Won-seok Lee, Yeosu-si (KR)

(73) Assignee: LG Chem, Ltd. (KR)

( * ) Notice: Subject to any disclaimer, the term of this patent is extended or adjusted under 35 U.S.C. 154(b) by 590 days.

(21) Appl. No.: 11/206,581

(22) Filed: Aug. 18, 2005

(65) Prior Publication Data
US 2006/0041062 A1 Feb. 23, 2006

(30) Foreign Application Priority Data
Aug. 19, 2004 (KR) ...................... 10-2004-0065276

(51) Int. Cl.
*C08L 47/00* (2006.01)
(52) U.S. Cl. .............................. 525/83; 525/70; 525/80; 525/84; 525/85; 525/902
(58) Field of Classification Search ................... 525/70, 525/80, 83, 84, 95, 902
See application file for complete search history.

(56) References Cited

U.S. PATENT DOCUMENTS 4,767,833 A  8/1988 Yumoto et al.
6,187,862 B1 *  2/2001 Chang et al. ................... 525/84
7,019,049 B1 *  3/2006 Yoo et al. ..................... 523/201

FOREIGN PATENT DOCUMENTS

EP  1 045 883 B1  7/2003
JP  11-147920  6/1999

* cited by examiner

*Primary Examiner*—Ana L Woodward
(74) *Attorney, Agent, or Firm*—Cantor Colburn LLP

(57) ABSTRACT

The present invention relates to a transparent thermoplastic resin composition which characteristically contains A) 20-80 weight % of graft copolymer composed of a) conjugated diene rubber latex; b) intermediate layer prepared by copolymerization of acrylic acid alkylester derivative and aromatic vinyl derivative with the above a); and c) graft layer prepared by copolymerization of methacrylic acid alkylester derivative or acrylic acid alkylester derivative, a romatic vinyl derivative and vinyl cyan derivative with the above b) and B) 20-80 weight % of MSAN copolymer prepared by copolymerization of methacrylic acid alkylester derivative or acrylic acid alkylester derivative, aromatic vinyl derivative and vinyl cyan derivative. The transparent thermoplastic resin composition of the present invention has enhanced transparency, impact strength, surface gloss, weather resistance and color by being prepared by the method of the invention which is characterized by the steps of forming an intermediate layer by adding acrylic rubber to polybutadiene rubber, grafting, and regulating refractive indices of each monomers of a copolymer.

12 Claims, No Drawings

TRANSPARENT THERMOPLASTIC RESIN COMPOSITIONS AND PROCESS FOR PREPARING THE SAME

This application claims the benefit of the filing date of Korean Patent Application No. 10-2004-0065276 filed on, in the Korean Intellectual Property Office, the disclosure of which is incorporated herein in its entirety by reference.

TECHNICAL FIELD

The present invention relates to a transparent thermoplastic resin composition and a preparation method of the same, more precisely, a transparent thermoplastic resin composition having excellent properties of transparency, impact strength, surface gloss and color resulted from the improved processes of creating an intermediate layer using polybutadiene rubber and acryl rubber, grafting to enhance weather resistance and thermal stability, and adding MSAN copolymer prepared by bulk polymerization, and a preparation method of the same.

BACKGROUND ART

ABS resin has been widely used in the fields of car supplies, electronic appliances, office automation supplies, etc, because of its' well balanced physical properties including impact strength and fluidity. Recently, the transparent materials have been under development to satisfy the need of consumers for different designs. As one example, a method to endow transparency to ABS resin by adding acrylic acid alkylester or methacrylic acid alkylester is described in U.S. Pat. No. 4,767,833, Japanese Patent No. 11-147920, and European Patent No. 1045883. The resins produced by the method show excellent impact resistance, workability, and surface gloss but poor weather resistance and light resistance, so that they are not good for outdoor uses. In addition, these resins have problems of weak thermal stability and chemical resistance and physical properties are reduced or weakened as time goes by. To improve weather resistance and thermal stability, an additive such as heat stabilizer and UV stabilizer might be added but it is not the fundamental solution for the problems. In the meantime, to increase chemical resistance, butadiene-styrene rubber was applied and the content of rubber was also increased, but it resulted in the low point of cold shock. As an effort to enhance chemical resistance, the content of acrylonitrile in resin was increased, but it resulted in yellow color resin, making the expression of natural colors difficult.

DISCLOSURE OF THE INVENTION

It is an object of the present invention, to solve the above problems, to provide a transparent thermoplastic resin composition having excellent transparency, impact strength, surface gloss, weather resistance and color and a preparation method of the same.

The above object of the present invention is achieved by the following embodiments of the present invention.

The above object and other objects of the present invention can be achieved by the following embodiments of the present invention.

The present invention is described in detail hereinafter.

To achieve the object of the invention, the present invention provides a transparent thermoplastic resin composition which is characterized by containing A) 20-80 weight % of graft copolymer composed of a) conjugated diene rubber latex; b) intermediate layer prepared by copolymerization of the above a) and acrylic acid alkylester derivative and aromatic vinyl derivative; c) graft layer prepared by copolymerization of the above b) and methacrylic acid alkylester derivative or acrylic acid alkylester derivative, aromatic vinyl derivative and vinyl cyan derivative; and B) 20-80 weight % of MSAN copolymer prepared by copolymerization of methacrylic acid alkylester derivative or acrylic acid alkylester derivative, aromatic vinyl derivative and vinyl cyan derivative.

The present invention also provides a preparation method for the transparent thermoplastic resin composition comprising the following steps: I) forming an intermediate layer (b) by mixing and polymerizing conjugated diene rubber latex (a), acrylic acid alkylester derivative and aromatic vinyl derivative; II) preparing graft copolymer (A) by forming a graft layer (c) by mixing and copolymerizing the intermediate layer prepared above with methacrylic acid alkylester derivative or acrylic acid alkylester derivative, aromatic vinyl derivative and vinyl cyan derivative; III) preparing MSAN copolymer (B) by bulk-polymerizing of methacrylic acid alkylester derivative or acrylic acid alkylester derivative, aromatic vinyl derivative and vinyl cyan derivative; and IV) mixing and kneading the above graft copolymer and MSAN copolymer.

In the above step (I), grafting agent and graft cross-linking agent can be added.

For 100 weight part of the whole graft copolymer (A), the rubber latex (a) is added by 5-70 weight part, the intermediate layer (b) is added by 1-40 weight part, and the graft layer is added by 30-90 weight part, and the sum of the rubber latex (a) and the intermediate layer (b) is preferably in the range of 10-70 weight part.

In step (I), the acrylic acid alkylester derivative is added by 1-20 weight part for 100 weight part of the whole graft copolymer (A) to produce the intermediate layer, and so is the aromatic vinyl derivative.

In step (II), the graft layer (c) contains methacrylic acid alkylester derivative or acrylic acid alkylester derivative by 20-65 weight part for 100 weight part of the whole graft copolymer (A), and aromatic vinyl derivative by 8-25 weight part and vinyl cyan derivative by 1-20 weight part.

In step (III), MSAN copolymer (B) is composed of 40-75 weight part of methacrylic acid alkylester derivative or acrylic acid alkylester derivative, 15-40 weight part of aromatic vinyl derivative and 3-20 weight part of vinyl cyan derivative for the 100 weight part of the copolymer.

Regarding the acceptable refractive index, the difference of refractive indices between conjugated diene rubber latex (a) and the rest of the components of intermediate layer (b) is under 0.01, the difference of refractive indices among conjugated diene rubber latex (a), all the components of intermediate layer (b) and all the components of graft layer (c) is under 0.05, and the difference of refractive indices between graft copolymer (A) and MSAN copolymer (B) is under 0.005.

Methacrylic acid alkylester derivative of the present invention is selected from a group consisting of methacrylic acid methylester, methacrylic acid ethylester, methacrylic acid propylester, methacrylic acid 2-ethyl hexylester, methacrylic acid decylester and methacrylic acid laurylester. As an acrylic acid alkylester derivative, one or more compounds are selected from a group consisting of butylacrylate, ethylacrylate, methylacrylate and 2-ethylhexylacrylate.

For aromatic vinyl derivative, one or more compounds are selected from a group consisting of styrene, α-methylstyrene, o-ethylstyrene, p-ethylstyrene, acrylonitrile and vinyl toluene.

For vinyl cyan derivative, one or more compounds are selected from a group consisting of acrylonitrile, methacrylonitrile and ethacrylonitrile.

The preferable content of grafting agent and graft cross-linking agent is 1 or less 1 weight part for 100 weight part of graft copolymer (A).

The grafting agent can be selected from a group consisting of arylmethacrylate (AMA), triarylisocyanulate (TAIC), triarylamine (TAA) and diarylamine (DAA), and one or more compounds can be selected for the graft cross-linking agent from a group consisting of ethylene glycol dimethacrylate, diethylene glycol dimethacrylate, triethylene glycol dimethacrylate, 1,3-butandiol dimethacrylate, 1,6-hexandiol dimethacrylate, neopentyl glycol dimethacrylate, trimethylcolpropane, trimethacrylate and trimethylol methane triacrylate.

Hereinafter, the present invention is described in detail.

The present invention relates to the preparation of a transparent resin having excellent impact strength, transparency, color and weather resistance, by the processes of copolymerization of 20-80 weight % of graft copolymer (A) [(a)+(b)+(c)=(A)] containing an intermediate layer (b) prepared by copolymerization of conjugated diene rubber latex (a) mixture, which has 800 Å-3500 Å of grain size, 70-95% of gel content and 12-30 of swelling index, with acrylic acid alkylester derivative and aromatic vinyl derivative with 20-80 weight % of MSAN copolymer (B) [(A)+(B)=100%] composed of methacrylic acid alkylester derivative or acrylic acid alkylester derivative, aromatic vinyl derivative and vinyl cyan derivative.

(I) Preparation of Graft Copolymer

For 100 weight part of graft copolymer (A), 1-20 weight part of acrylic acid alkylester, 1-20 weight part of aromatic vinyl derivative, and 0-1 weight part, preferably 0.01-0.6 weight part, of each graft cross-linking agent and grafting agent were added to 5-70 weight part (solid content) of conjugated diene rubber latex (a) used as a seed to produce an intermediate layer (b). To the intermediate layer were added methacrylic acid alkylester derivative or acrylic acid alkylester derivative by 20-65 weight part, aromatic vinyl derivative by 8-25 weight part and vinyl cyan derivative by 1-20 weight part, resulting in graft copolymer (c). Polymerization of the intermediate layer and graft copolymerization are performed by conventional emulsion polymerization. In general, refractive index is varied from the content and the ratio of monomers. Thus, the determination of the content and the ratio of monomers are very important to produce a transparent resin. Refractive index of a mixture definitely affects the transparency, which means the refractive index can be regulated by the content and the ratio of monomers.

To endow transparency to a resin, the refractive index of conjugated diene rubber compound has to be similar level to those of the whole components of the intermediate layer (b) to be grafted to the rubber compound (at this time, the refractive index of the whole components means post-polymerization refractive index of the monomer mixture, not the refractive index of the mixture itself) and the whole components of graft layer (c), in particular, the refractive index of conjugated diene is preferred to be the same as that of the whole components for grafting.

$$\text{Refractive index of graft polymer} = Wt_A \cdot RI_A + Wt_B \cdot RI_B + Wt_C \cdot RI_C + \ldots + Wt_i \cdot RI_i \quad \text{[Mathematical Formula 1]}$$

$Wt_A$=Weight % of A component derivative, $RI_A$=Refractive index of A polymer
$Wt_B$=Weight % of B component derivative, $RI_B$=Refractive index of B polymer
$Wt_C$=Weight % of C component derivative, $RI_C$=Refractive index of C polymer
$Wt_i$=Weight % of i component derivative, $RI_i$=Refractive index of i polymer (a) Seed Conjugated diene rubber latex used as a seed (a) is generally butadiene rubber latex or styrene-butadiene copolymer rubber latex, particularly butadiene rubber latex is preferred. Styrene-butadiene copolymer rubber latex is also used as a seed but when the content of styrene in the styrene-butadiene copolymer rubber latex is increased, cold shock resistance and chemical resistance are reduced. The preferable content of rubber latex in 100 weight part of graft copolymer (A) is 5-60 weight part, and 10-50 weight part is more preferred. When the content of rubber latex is less than 5 weight part, impact strength and cold shock resistance decrease. On the contrary, when the content of rubber latex is over 60 weight part, weather resistance is reduced. The rubber latex has 1000-5000 Å of granule size at average, 50-95% gel content and 12-40 of swelling index is preferred.

(b) Intermediate Layer

Intermediate layer (b) is prepared by polymerizing 1-20 weight part of acrylic acid alkylester, 1-20 weight part of aromatic vinyl derivative, and 0-1 weight part of each grafting agent and graft cross-linking agent. The intermediate layer takes 2-40 weight part of total 100 weight part of graft copolymer (A). When the content of the intermediate layer is less than 2 weight part in 100 weight part of graft copolymer (A), thermal stability and UV stability decrease. When the content of the intermediate layer is over 40 weight part, other physical properties such as tensile strength and bending strength decrease. When the contents of acrylic acid alkylester, aromatic vinyl derivative and vinyl cyan derivative are out of the above range, transparency is reduced.

As acrylic acid alkylester monomer to be added to the intermediate layer (b), butyl acrylate, ethyl acrylate, or methyl acrylate is used. As aromatic vinyl derivative for the intermediate layer, one or more compounds are selected from a group consisting of styrene, α-methylstyrene, ρ-methylstyrene, acronitrile and vinyl toluene. A graft cross-linking agent to be added to the intermediate layer (b) is selected from a group consisting of ethylene glycol dimethacrylate, diethylene glycol dimethacrylate, triethylene glycol dimethacrylate, 1,3-butandiol dimethacrylate, 1,6-hexandiol dimethacrylate, neopentyl glycol dimethacrylate, trimethylcolpropane trimethacrylate and trimethylol methane triacrylate. As a grafting agent, one or more compounds selected from a group consisting of arylmethacrylate (AMA), triarylisocyanulate (TAIC), triarylamine (TAA) and diarylamine (DAA) can be used. The content of a grafting agent and a graft cross-linking agent in 100 weight part of the intermediate layer (b) is generally 0-2 weight part, and more preferably 0-1 weight part. When the content is over 2 weight part, physical properties including impact strength are weakened. In the graft copolymer, it is preferred for the sum of the contents of seed (a) and intermediate layer (b) to be in the range of 10-70 weight part. When the sum of seed (a) and intermediate layer (b) contents is less than 10 weight part, impact strength drops. On the contrary, when the sum of the two is more than 70 weight part, the surface of the final resin product is uneven and has flow marks and lowered impact strength.

The refractive index of each monomer is a crucial factor affecting transparency of a resin, and is regulated by the content and the ratio of monomers. If the difference of refractive indices between the conjugated diene rubber latex and the intermediate layer is over 0.01, it is inappropriate for the present invention.

Refractive index of each component (refractive index of post-polymerization polymer) is as follows; refractive index of butadiene is 1.518, refractive index of butyl acrylate is 1.465, and refractive index of styrene is 1.592, and refractive index of intermediate layer is calculated as follows.

$$\text{Refractive index of intermediate layer polymer} = Wt_A \cdot RI_A + Wt_S \cdot RI_S \quad \text{[Mathematical Formula 2]}$$

$Wt_A$=Weight % of acrylic acid alkylester derivative
$RI_A$=Refractive index of acrylic acid alkylester polymer
$Wt_S$=Weight % of aromatic vinyl derivative
$RI_S$=Refractive index of aromatic vinyl polymer (c) Graft Layer To form a graft layer, copolymerization of methacrylic acid alkylester derivative or acrylic acid alkylester derivative (20-65 weight part), aromatic vinyl derivative (8-25 weight part) and vinyl cyan derivative (1-20 weight part) with latex having a seed (a) and an intermediate layer (b) formed above is induced. The graft layer (c) takes 30-90 weight part for the 100 weight part of graft copolymer (A). When the content of the graft layer (c) in the whole graft copolymer (A) is less than 30 weight part, the surface of the final product is uneven and has flow marks. On the contrary, when the content of the graft layer is over 90 weight part, impact strength and chemical resistance are decreased. When vinyl cyan derivative is added by less than 1 weight part, chemical resistance, scratch resistance and impact strength are decreased. In the meantime, when the vinyl cyan derivative is added by more than 20 weight part, the color of the product changes into yellow. When the contents of methacrylic acid or acrylic acid alkylester and aromatic vinyl derivative are out of the range mentioned above, transparency is reduced.

Methacrylic acid alkylester derivative of the graft layer(c) is composed of one or more compounds selected from a group consisting of methyl methacrylate, methacrylic acid methylester, methacrylic acid ethylester, methacrylic acid propylester, methacrylic acid 2-ethylhexylester, methacrylic acid desylester and methacrylic acid laurylester. And acrylic acid alkylester derivative is composed of one or more compounds selected from a group consisting of butyl acrylate, ethyl acrylate, methyl acrylate and 2-ethylhexyl acrylate.

For the aromatic vinyl derivative, one or more compounds can be selected from a group consisting of styrene, α-methylstyrene, o-ethylstyrene, p-ethylstyrene, acrylonitrile and vinyl toluene. Also, vinyl cyan derivative of the above (c) can be one of acrylonitrile or methacrylonitrile.

To endow transparency to a resin, the refractive index of the seed (a) components should be similar to or the same as that of the intermediate layer (b) components. The bigger difference than 0.005 between refractive indices of the copolymer of the seed (a) components and the intermediate layer (b) components and that of a grafting layer (c) is inappropriate for the present invention.

Refractive index of each component (refractive index of post-polymerization polymer) is as follows; refractive index of butadiene is 1.518, refractive index of methyl methacrylate is 1.49, and refractive index of styrene is 1.592, and refractive index of grafted polymer is calculated as follows.

$$\text{Refractive index of graft polymer} = Wt_A \cdot RI_A + Wt_S \cdot RI_S + Wt_M \cdot RI_M \quad \text{[Mathematical Formula 3]}$$

$Wt_A$=Weight % of vinyl cyan derivative
$RI_A$=Refractive index of vinyl cyan polymer
$Wt_S$=Weight % of aromatic vinyl derivative
$RI_S$=Refractive index of aromatic vinyl polymer
$Wt_M$=Weight % of acrylic acid (or methacrylic acid) alkylester derivative
$RI_M$=Refractive index of acrylic acid (or methacrylic acid) alkylester polymer (II) Preparation of MSAN For 100 weight part of MSAN copolymer, 40-75 weight part of methacrylic acid alkylester derivative or acrylic acid alkylester derivative, 15-40 weight part of aromatic vinyl derivative, and 3-20 weight part of vinyl cyan derivative were added. Refractive index of the copolymer should be similar to that of graft copolymer (A) prepared in the above step (I). The preparation method for the copolymer of step (II) is not limited but suspension polymerization or bulk polymerization is preferred. In particular, continuous bulk polymerization is the most preferable method in the aspects of manufacturing cost. In addition, bulk polymerization allows the increase of the content of acrylonitrile. If polymerization is induced in water, for example emulsion polymerization or suspension polymerization, the content of acrylonitrile has to be limited. For example, when the content of acrylonitrile is high, acrylonitrile that is a hydrophilic monomer produces numbers of homo polymers, resulting in a yellow resin. With the bulk polymerization, homo polymers are less produced even with the high content of vinyl cyan derivative, so color change into yellow is less observed. Chemical resistance and impact resistance increase with the increase of vinyl cyan derivative content. The content of vinyl cyan derivative herein is 3-20 weight part. When the content of vinyl cyan derivative is less than 3 weight part, chemical resistance, stretch resistance and impact strength are decreased. On the contrary, when the content of vinyl cyan derivative is over 20 weight part, the color of the product turns into yellow. When the contents of methacrylic acid or acrylic acid alkylester and aromatic vinyl derivative are out of the range mentioned above, transparency is reduced.

Aromatic vinyl derivative used in the above step (II) can be styrene, α-methylstyrene, p-methylstyrene, or vinyl toluene, and among these, styrene is preferred. As vinyl cyan derivative, acrylonitrile or methacrylonitrile is preferably used. For methacrylic acid or acrylic acid alkylester derivative, one or more compounds selected from a group consisting of methacrylic acid methylester, methacrylic acid ethylester, methacrylic acid propylester, methacrylic acid 2-ethylhexylester, methacrylic acid decylester, methacrylic acid laurylester, etc are used, and in particular methyl methacrylate, one of methacrylic acid methylester, is most preferred.

Refractive index of graft copolymer (A) should be similar to or the same as that of MSAN copolymer (B). The bigger difference of refractive indices than 0.005 between (A) and (B) causes the decrease of transparency, which is inappropriate for the present invention.

Refractive index of each component (refractive index of post-polymerization polymer) is as follows; refractive index of butadiene is 1.518, refractive index of methyl methacrylate is 1.49, refractive index of styrene is 1.592, and refractive index of acrylonitrile is 1.52. And refractive index of grafted polymer is calculated as follows.

$$\text{Refractive index of MSAN} = Wt_A \cdot RI_A + Wt_S \cdot RI_S + Wt_M \cdot RI_M \quad \text{[Mathematical Formula 4]}$$

$Wt_A$=Weight % of vinyl cyan derivative
$RI_A$=Refractive index of vinyl cyan polymer
$Wt_S$=Weight % of aromatic vinyl derivative
$RI_S$=Refractive index of aromatic vinyl polymer
$Wt_M$=Weight % of acrylic acid (or methacrylic acid) alkylester derivative
$RI_M$=Refractive index of acrylic acid (or methacrylic acid) alkylester polymer

BEST MODE FOR CARRYING OUT THE INVENTION

Practical and presently preferred embodiments of the present invention are illustrative as shown in the following Examples.

However, it will be appreciated that those skilled in the art, on consideration of this disclosure, may make modifications and improvements within the spirit and scope of the present invention.

PREPARATIVE EXAMPLE 1

Preparation of Graft Copolymer

Preparative Example 1-1

To 20 weight part of rubber latex, prepared by emulsion polymerization, having 70% gel content and 0.3 μm of average granule size were added a series of 100 weight part of ion-exchanged water, 0.5 weight part of dioctyl sulfosuccinate as an emulsifier, 17.5 weight part of butylacrylate, 12.5 weight part of styrene, 0.28 weight part of ethylene glycol dimethacrylate as a graft cross-linking agent, 0.1 weight part of arylmethacrylate as a grafting agent, 0.1 weight part of sodium bicarbonate as an electrolyte, and 0.06 weight part of potassium persulfate as a polymerization initiator, followed by polymerization at 70° C. for 3 hours. To enhance polymerization conversion rate, the reaction was continued at 80° C. for one more hour to complete the intermediate layer.

To the latex with the intermediate layer were consecutively added 100 weight part of ion-exchanged water, 0.5 weight part of sodium oleate as an emulsifier, 34.56 weight part of methyl methacrylate, 13.44 weight part of styrene as an aromatic vinyl derivative, 2 weight part of acrylonitrile as a vinyl cyan derivative, 0.5 weight part of grade 3 dodecylmercaptan as a molecular weight regulator, 0.048 weight part of sodium pyrophosphate as an electrolyte, 0.012 weight part of dextrose, 0.001 weight part of ferrous sulphide, and 0.04 weight part of cumenehydroperoxide as a polymerization initiator at 75° C. for 5 hours, followed by reaction. Then, the temperature was raised to 80° C., followed by aging for 1 hour and then the reaction was terminated. The latex was coagulated with calcium chloride solution and washed to obtain powders.

To measure refractive index of a copolymer, a copolymer was flattened 0.2 mm thin, and then refractive index was measured at 25° C. by using Abbe refratometer. As a result, refractive index of the graft copolymer was 1.518.

Preparative Example 1-2

To 40 weight part of rubber latex, prepared by emulsion polymerization, having 70% gel content and 0.3 μm of average granule size were added a series of 100 weight part of ion-exchanged water, 0.5 weight part of sodium oleate as an emulsifier, 41.76 weight part of methyl methacrylate, 16.24 weight part of styrene, 2 weight part of acrylonitrile, 0.5 weight part of grade 3 dodecylmercaptan, 0.048 weight part of sodium pyrophosphate, 0.012 weight part of dextrose, 0.001 weight part of ferrous sulphide, and 0.04 weight part of cumenehydroperoxide at 75° C. for 5 hours, followed by reaction. Then, the temperature was raised to 80° C, followed by aging for 1 hour and then the reaction was terminated. Polymerization conversion rate was 99.8% and solid coagulum confent was 0.1%. The latex was coagulated with calcium chloride solution and washed to obtain powders.

Refractive index was measured by the same method as described in Preparative Example 1 -1. As a result, refractive index of the graft copolymer was 1.518.

Preparative Example 1-3

To 10 weight part of rubber latex, prepared by emulsion polymerization, having 70% gel content and 0.3 μm of average granule size were added a series of 50 weight part of ion-exchanged water, 0.25 weight part of dioctyl sulfosuccinate as an emulsifier, 8.75 weight part of butylacrylate, 6.25 weight part of styrene, 0.14 weight part of ethylene glycol dimethacrylate as a graft cross-linking agent, 0.05 weight part of arylmethacrylate as a grafting agent, 0.05 weight part of sodium bicarbonate as an electrolyte, and 0.03 weight part of potassium persulfate as a polymerization initiator, followed by polymerization at 70° C. for 3 hours. To enhance polymerization conversion rate, the reaction was continued at 80° C. for one more hour to complete the intermediate layer.

To the latex with the intermediate layer were consecutively added 150 weight part of ion-exchanged water, 0.75 weight part of sodium oleate as an emulsifier, 48.96 weight part of methyl methacrylate, 19.04 weight part of styrene as an aromatic vinyl derivative, 7 weight part of acrylonitrile as a vinyl cyan derivative, 0.5 weight part of grade 3 dodecylmercaptan as a molecular weight regulator, 0.048 weight part of sodium pyrophosphate as an electrolyte, 0.012 weight part of dextrose, 0.001 weight part of ferrous sulphide, and 0.04 weight part of cumenehydroperoxide as a polymerization initiator at 75° C. for 5 hours, followed by reaction. Then, the temperature was raised to 80° C., followed by aging for 1 hour and then the reaction was terminated. The latex was coagulated with calcium chloride solution and washed to obtain powders.

Refractive index was measured by the same method as described in Preparative Example 1 -1. As a result, refractive index of the graft copolymer was 1.518.

Preparative Example 1-4

To 50 weight part of rubber latex, prepared by emulsion polymerization, having 70% gel content and 0.3 μm of average granule size were added a series of 150 weight part of ion-exchanged water, 0.5 weight part of dioctyl sulfosuccinate as an emulsifier, 17.28 weight part of butylacrylate, 12.72 weight part of styrene, 0.28 weight part of ethylene glycol dimethacrylate as a graft cross-linking agent, 0.1 weight part of arylmethacrylate as a grafting agent, 0.1 weight part of sodium bicarbonate as an electrolyte, and 0.06 weight part of potassium persulfate as a polymerization initiator, followed by polymerization at 70° C. for 3 hours. To enhance polymerization conversion rate, the reaction was continued at 80° C. for one more hour to complete the intermediate layer.

To the latex with the intermediate layer were consecutively added 50 weight part of on-exchanged water, 0.5 weight part of sodium oleate as an emulsifier, 14.4 weight part of methyl methacrylate, 5.6 weight part of styrene as an aromatic vinyl derivative, 2 weight part of acrylonitrile as a vinyl cyan derivative, 0.5 weight part of grade 3 dodecylmercaptan as a molecular weight regulator, 0.048 weight part of sodium pyrophosphate as an electrolyte, 0.012 weight part of dextrose, 0.001 weight part of ferrous sulphide, and 0.04 weight part of cumenehydroperoxide as a polymerization initiator at 75 ° C. for 5 hours, followed by reaction. Then, the temperature was raised to 80 ° C., followed by aging for 1 hour and then the reaction was terminated. The latex was coagulated with calcium chloride solution and washed to obtain powders.

Refractive index was measured by the same method as described in Preparative Example 1-1. As a result, refractive index of the graft copolymer was 1.518.

PREPARATIVE EXAMPLE 2

Preparation of MSAN Copolymer

Preparative Example 2-1

63.36 weight part of methyl methacrylate, 24.64 weight part of styrene and 12 weight part of acrylonitrile were mixed together with 30 weight part of toluene, a solvent and 0.15 weight part of ditertiary dodecyl mercaptan was added as a molecular weight regulator. The mixture was loaded serially in a reactor, in which reaction time and temperature were adjusted to 3 hour and 148° C. respectively. The polymeric solution taken out of the reactor was heated in a pre-heating chamber, and transferred into an evaporating chamber to evaporate non-reacted monomers. The temperature of the polymer was kept at 210° C. and copolymer resin was processed in the form of pellet by using polymer feed pump extruder. The final refractive index of the pellet was 1.518.

Preparative Example 2-2

51.36 weight part of methyl methacrylate, 36.64 weight part of styrene and 5 weight part of acrylonitrile were mixed together with 30 weight part of toluene, a solvent and 0.15 weight part of ditertiary dodecyl mercaptan was added as a molecular weight regulator. The mixture was loaded serially in a reactor, in which reaction time and temperature were adjusted to 3 hour and 148° C. respectively. The polymeric solution taken out of the reactor was heated in a pre-heating chamber, and transferred into an evaporating chamber to evaporate non-reacted monomers. The temperature of the polymer was kept at 210° C. and copolymer resin was processed in the form of pellet by using polymer feed pump extruder. The final refractive index of the pellet was 1.53.

Preparative Example 2-3

71.28 weight part of methyl methacrylate, 27.72 weight part of styrene and 1 weight part of acrylonitrile were mixed together with 30 weight part of toluene, a solvent and 0.15 weight part of ditertiary dodecyl mercaptan was added as a molecular weight regulator. The mixture was loaded serially in a reactor, in which reaction time and temperature were adjusted to 3 hour and 148° C. respectively. The polymeric solution taken out of the reactor was heated in a pre-heating chamber, and transferred into an evaporating chamber to evaporate non-reacted monomers. The temperature of the polymer was kept at 210° C. and copolymer resin was processed in the form of pellet by using polymer feed pump extruder. The final refractive index of the pellet was 1.518.

Example and Comparative Example

The graft copolymer and MSAN copolymer, respectively prepared in Preparative Examples 1 and 2, were mixed as shown in Table 1. 0.1 weight part of lubricant and 0.2 weight part of antioxidant were added to the mixture, which was processed in the form of pellet by using biaxial extruding kneader at 220° C. (temperature of cylinder). Test sample was prepared by injecting the pellet and physical properties of the sample were investigated. The results are shown in Table 2.

Haze Value measurement: ASTM D1003 method.

Izod impact strength (kg.cm/cm): ASTM D256 (¼ notched at 25° C.) method.

Surface gloss: ASTM D528 (45°) method.

Weather resistance: Gloss was measured after leaving resin for 400 hours in weather-o-meter (ATLAS Co. Ci35A) of 83° C., with water-spray cycle of 18 min/120 mm.

Color (b value): b value (yellowness) was measured by using color Quest II (Hunter Lab).

Chemical resistance: Tensile strength test sample was put in the jig of 1.0% strain, and brake oil was loaded in the center of the test sample. The test sample was left for one day, followed by observation on changes.

OK: No changes of test sample were observed.

C: Crack developed.

B: Break developed.

TABLE 1

|  | Graft Copolymer | | | | MSAN Copolymer | | |
| --- | --- | --- | --- | --- | --- | --- | --- |
|  | 1-1 | 1-2 | 1-3 | 1-4 | 2-1 | 2-2 | 2-3 |
| Example | 50 | — | — | — | 50 | — | — |
| Comparative Example 1 | 50 | — | — | — | — | 50 | — |
| Comparative Example 2 | — | 50 | — | — | 50 | — | — |
| Comparative Example 3 | — | — | 100 | — | — | — | — |
| Comparative Example 4 | — | — | — | 30 | 70 | — | — |
| Comparative Example 5 | 50 | — | — | — | — | — | 50 |

TABLE 2

|  | Haze | Impact Strength (kg cm/cm) | Surface Gloss | Weather Resistance | Chemical Resistance | Color (b value) |
| --- | --- | --- | --- | --- | --- | --- |
| Example | 2 | 17 | 93 | 88 | OK | 1.5 |
| Comparative Example 1 | 90 | 17 | 93 | 86 | OK | X |
| Comparative Example 2 | 1.9 | 18 | 94 | 62 | C | 0.5 |
| Comparative Example 3 | 2.2 | 16 | 95 | 89 | OK | 5.5 |
| Comparative Example 4 | 10.5 | 10 | 78 | 69 | C | 4 |
| Comparative Example 5 | 2 | 10 | 88 | 85 | B | 0.5 |

As shown in Table 2, a transparent resin having excellent transparency, impact strength, weather resistance and color could be prepared by using MSAN and graft copolymers in which refractive indices of a seed, an intermediate layer and a graft layer were all equal. In Comparative Example 1, refractive indices of graft copolymer and MSAN were not equal and the difference was bigger than 0.005, resulting in an opaque resin. In Comparative Example 2, graft copolymer without an intermediate layer was used to produce a resin, resulting in a resin having excellent impact strength and transparency but reduced weather resistance. In Comparative Example 3, a resin was prepared by emulsion polymerization without MSAN. The product showed harsh and poor color, compared with the product of the Example of the invention, having the same composition as that of Example, though. Emulsion polymerization seems to be a method inducing mass-production of acrylonitrile homopolymer but causing poor color of a product, when it is applied alone. To improve the color expression, it is needed to reduce the content of acrylonitrile, but it results in the decrease of impact strength and chemical resistance. In Comparative Example 4, the sum of a seed and an intermediate layer in graft copolymer is over 70 weight part. In this case, the product showed uneven surface and poor gloss, in addition to poor physical properties including transparency and impact strength. In Comparative Example 5, the content of acrylonitrile, a vinyl cyan compound, in MSAN is just 1 weight part, which is out of the acceptable range, resulting in reduced impact strength and chemical resistance.

INDUSTRIAL APPLICABILITY

As explained hereinbefore, the transparent thermoplastic resin composition of the present invention prepared by using graft copolymer, in which refractive indices of each seed, intermediate layer and graft layer are equal, and MSAN copolymer prepared by copolymerization by bulk polymerization has excellent transparency, impact strength, surface gloss, weather resistance, and color.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A transparent thermoplastic resin composition comprising:
   A) 20-80 weight % of graft copolymer composed of
      a) conjugated diene rubber latex;
      b) intermediate layer on the conjugated diene rubber prepared by copolymerization of acrylic acid alkylester monomer and aromatic vinyl monomer in the presence of the (a) conjugated diene rubber latex; and
      c) graft layer prepared by copolymerization of methacrylic acid alkylester monomer or acrylic acid alkylester monomer, aromatic vinyl monomer and vinyl cyan monomer in the presence of the conjugated diene rubber latex with the intermediated layer (b) and
   B) 20-80 weight % of (meth)acrylic acid-aromatic vinyl compound-vinylcyanide copolymer prepared by copolymerization of methacrylic acid alkylester monomer or acrylic acid alkylester monomer, aromatic vinyl monomer and vinyl cyan monomer, wherein weight % is relative to the total weight % of the thermoplastic resin composition, and wherein the difference of refractive indices between conjugated diene rubber latex (a) and the total components of the intermediate layer (b) is less then 0.01; and
   wherein the difference of refractive indices among conjugated diene rubber latex (a), the total components of the intermediate layer (b) and the total components of the graft layer (c) is less than 0.005; and
   wherein the difference of refractive indices between the graft copolymer (A) and the (meth)acrylic acid-aromatic vinyl compound-vinylcyanide copolymer (B) is less than 0.005;
   wherein the transparent thermoplastic resin composition comprises 5-60 weight part of rubber latex (a), 2-40 weight part of intermediate layer (b), 30-90 weight part of graft layer (c) to 100 weight part of the graft copolymer (A, the sum of the rubber latex (a) and the intermediate layer (b) is 10-70 weight part to 100 part of the graft copolymer (A);
   wherein the intermediate layer (b) comprises 1-20 part of acrylic acid alkylester monomer and 1-20 weight part of aromatic vinyl monomer to 100 weight part of the graft copolymer (A);
   wherein the graft layer (c) comprises 20-65 weight part of methacrylic acid alkylester or acrylic acid alkylester monomer, 8-25 weight part of aromatic vinyl monomer and 1-20 weight part of vinyl cyan monomer to 100 weight part of the graft copolymer (A); and
   wherein the meth(acrylic acid-aromatic vinyl compound-vinylcyanide copolymer (B) contains 40-75 weight part of methacrylic acid alkylester monomer or acrylic acid alkylester monomer, 15-40 weight part of aromatic vinyl monomer, and 3-20 weight part of vinyl cyan monomer to 100 weight part of the whole (meth)acrylic acid-aromatic vinyl compound-vinylcyanide copolymer (B).

2. The transparent thermoplastic resin composition as set forth in claim 1, in which methacrylic acid alkylester monomer or acrylic acid alkylester monomer is one or more compounds selected from the group consisting of methacrylic acid methylester, methacrylic acid ethylester, methacrylic acid propylester, methacrylic acid 2-ethyl hexylester, methacrylic acid decylester, methacrylic acid laurylester, butylacrylate, ethylacrylate and methylacrylate.

3. The transparent thermoplastic resin composition as set forth in claim 1, in which aromatic vinyl monomer is one or more compounds selected from a group consisting of styrene, α-methylstyrene, o-ethylstyrene, p-ethylstyrene and vinyl toluene.

4. The transparent thermoplastic resin composition as set forth in claim 1, in which vinyl cyan monomer is one or more compounds selected from a group consisting of acrylonitrile, methacrylonitrile and ethacrylonitrile.

5. A preparation method for the transparent thermoplastic resin composition comprising the following steps:
   I) forming an intermediate layer on a conjugated diene rubber (b) by mixing and polymerizing acrylic acid alkylester monomer and aromatic vinyl monomer in the presence of the conjugated diene rubber latex;
   II) preparing graft copolymer (A) by forming a graft layer (c) by mixing and copolymerizing the intermediate layer prepared above with methacrylic acid alkylester monomer or acrylic acid alkylester monomer, aromatic vinyl monomer and vinyl cyan monomer;
   III) preparing (meth)acrylic acid-aromatic vinyl compound-vinylcyanide copolymer (B) by bulk-polymerizing of methacrylic acid alkylester monomer or acrylic acid alkylester monomer, aromatic vinyl monomer and vinyl cyan monomer; and IV) mixing and kneading the above graft copolymer and (meth)acrylic acid-aromatic vinyl compound-vinylcyanide copolymer, wherein the difference of refractive indices between conjugated diene rubber latex (a) and the total components of the intermediate layer is under 0.01; and wherein the difference of refractive indices among conjugated diene rubber latex (a), total components of the intermediate layer (b) and the total components of graft layer (c) is under 0.005; and wherein the difference of refractive indices between graft copolymer (A) and (meth)acrylic acid-aromatic vinyl compound-vinylcyanide copolymer (B) is under 0.005;

wherein the transparent thermoplastic resin composition comprises 5-60 weight part of rubber latex (a), 2-40 weight part of intermediate layer (b), 30-90 weight part of graft layer (c) to 100 weight part of the graft copolymer (A, the sum of the rubber latex (a) and the intermediate layer (b) is 10-70 weight part to 100 part of the graft copolymer (A);

wherein the intermediate layer (b) comprises 1-20 part of acrylic acid alkylester monomer and 1-20 weight part of aromatic vinyl monomer to 100 weight part of the graft copolymer (A);

wherein the graft layer (c) comprises 20-65 weight part of methacrylic acid alkylester or acrylic acid alkylester monomer, 8-25 weight part of aromatic vinyl monomer and 1-20 weight part of vinyl cyan monomer to 100 weight part of the graft copolymer (A); and wherein the meth(acrylic acid-aromatic vinyl compound-vinylcyanide copolymer (B) contains 40-75 weight part of methacrylic acid alkylester monomer or acrylic acid alkylester monomer, 15-40 weight part of aromatic vinyl monomer, and 3-20 weight part of vinyl cyan monomer to 100 weight part of the whole (meth)acrylic acid-aromatic vinyl compound-vinylcyanide copolymer (B).

6. The preparation method for the transparent thermoplastic resin composition as set forth in claim 5, in which grafting agent and graft cross-linking agent are added in the step (I).

7. The preparation method for the transparent thermoplastic resin composition as set forth in claim 6, wherein each of the grafting agent and the graft cross-linking agent is added in the step (I) by 1 weight part or less, wherein the weight part is relative to 100 weight part of the graft copolymer (A).

8. The preparation method for the transparent thermoplastic resin composition as set forth in claim 6, in which grafting agent is one or more compounds selected from a group consisting of arylmethacrylate (AMA), triarylisocyanulate (TAIC), triarylamine (TAA) and diarylamine (DAA).

9. The preparation method for the transparent thermoplastic resin composition as set forth in claim 6, in which graft cross-linking agent is one or more materials selected from a group consisting of ethylene glycol dimethacrylate, diethylene glycol dimethacrylate, triethylene glycol dimethacrylate, 1,3-butandiol dimethacrylate, 1,6-hexandiol dimethacrylate, neopentyl glycol dimethacrylate, trimethylcolpropane, trimethacrylate and trimethylol methane triacrylate.

10. The preparation method of the transparent thermoplastic resin composition as set forth in claim 5, in which methacrylic acid alkylester monomer or acrylic acid alkylester monomer is one or more compounds selected from the group consisting of methacrylic acid methylester, methacrylic acid ethylester, methacrylic acid propylester, methacrylic acid 2-ethyl hexylester, methacrylic acid decylester, methacrylic acid laurylester, butylacrylate, ethylacrylate and methylacrylate.

11. The preparation method for the transparent thermoplastic resin composition as set forth in claim 5, in which aromatic vinyl monomer is one or more compounds selected from a group consisting of styrene, α-methylstyrene, o-ethylstyrene, p-ethylstyrene and vinyl toluene.

12. The preparation method for the transparent thermoplastic resin composition as set forth in claim 5, in which vinyl cyan monomer is one or more compounds selected from a group consisting of acrylonitrile, methacrylonitrile and ethacrylonitrile.

* * * * *